United States Patent
Seo

(10) Patent No.: US 7,327,792 B2
(45) Date of Patent: Feb. 5, 2008

(54) DIGITAL VIDEO SYSTEM AND CONTROL METHOD THEREOF

(75) Inventor: Young-joo Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 919 days.

(21) Appl. No.: 10/622,798

(22) Filed: Jul. 21, 2003

(65) Prior Publication Data

US 2004/0071218 A1 Apr. 15, 2004

(30) Foreign Application Priority Data

Jul. 19, 2002 (KR) ...................... 10-2002-0042669

(51) Int. Cl.
*H04B 1/66* (2006.01)

(52) U.S. Cl. ........................... 375/240.27; 375/240.25; 375/240.26; 375/240.01; 348/731; 348/725; 348/726; 714/774; 714/704; 714/748; 714/746; 714/750

(58) Field of Classification Search ........... 375/240.27, 375/240.25, 240.01, 240.26; 348/731, 725, 348/726; 714/774, 704, 746, 748, 750
See application file for complete search history.

(56) References Cited

U.S. PATENT DOCUMENTS 5,555,463 A * 9/1996 Staron ........................ 348/560
6,044,485 A * 3/2000 Dent et al. .................. 714/774

* cited by examiner

*Primary Examiner*—Shawn S. An
(74) *Attorney, Agent, or Firm*—Sughrue Mion, PLLC

(57) ABSTRACT

A digital video system for wirelessly transmitting a signal to a display device, including a receiver that analyzes a packet of the signal wirelessly received through a first transmitting/receiving unit to check the transmission error rate. The receiver externally sends out a grade adjustment request signal requesting up-adjustment or down-adjustment of a resolution grade of the signal through the first: transmitting/receiving unit, based on the checked transmission error rate and a resolution grade of the currently received signal. A transmitter converts the signal to be transmitted to the receiver into a signal that corresponds to the grade adjustment request signal of the receiver, and wirelessly transmits the converted signal through a second transmitting/receiving unit corresponding to the first transmitting/receiving unit. The digital video system adjusts the grade of the signals to be transmitted based on changes in the wireless communication environment, to maintain the signal transmission rate within a range.

9 Claims, 4 Drawing Sheets

DIGITAL VIDEO SYSTEM AND CONTROL METHOD THEREOF

BACKGROUND OF THE INVENTION

This application claims benefit under 35 U.S.C., section 119, to Korean patent application 2002-42669, filed Jul. 19, 2002, the contents of which is incorporated herein by reference.

1. Field of the Invention

The present invention relates to a digital video system and a control method, and more particularly to a digital video system and a control method capable of adjusting a grade of a video signal to reduce a transmission error rate of the video signal received wirelessly.

2. Background of the Related Art

A related art digital broadcasting scheme adopting a Moving Picture Experts Group (MPEG) image compression technique as a standard has been in commercial use. Further, a digital video system of a subscriber for receiving the digital broadcasting comprises a set-top box and a display device. Generally, the set-top box and display device are connected through a communication interface such as a cable network.

Recently, a related art flat panel display such as a PDP (Plasma Display Panel), LCD (Liquid Crystal Display) has become popular. The flat panel display is manufactured without an internal set-top box so that an external set-top box is connected thereto, to maximize the advantage of a thin feature of the flat panel display.

However, if the flat panel display is connected to the set-top box by a cable, the exposed cable defiles the appearance of the system, and further, the long cable attenuates a signal.

To solve these related art problems, a related art wireless digital video system capable of wirelessly receiving a video signal from the set-top box is being developed. However, with the related art wireless digital video system, noise or distortion of a video signal by frequency interference occurs when the video signal is transmitted from the set-top box to the display device. The possibility of signal distortion is much higher in wireless transmission than in wireline transmission. When the signal distortion is extreme, the display device cannot properly output an image and voice.

SUMMARY OF THE INVENTION

An object of the present invention is to solve at least the above problems and/or disadvantages, and to provide at least the advantages described hereinafter.

Accordingly, it is an aspect of the present invention to provide a digital video system and a control method thereof, capable of adjusting a video signal so that display of the video signal can be performed in correspondence with the wireless communication environment.

The above aspect of the present invention is achieved by providing a digital video system for adjusting a grade of a wirelessly transmitted signal, including a receiver that analyzes a packet of the wirelessly transmitted signal, wirelessly received from a first transmitting/receiving unit, to check the transmission error rate thereof, and outputs a grade adjustment request signal requesting one of an up-adjustment and a down-adjustment of a resolution grade of the signal to the first transmitting/receiving unit in accordance with the checked transmission error rate and a current resolution grade of the current received wirelessly transmitted signal, and a transmitter that converts the wirelessly transmitted signal to be transmitted to the receiver into another wirelessly transmitted signal corresponding to the grade adjustment request signal of the receiver, and wirelessly transmits the converted signal through a second transmitting/receiving unit to the first transmitting/receiving unit.

The receiver includes a MPEG decoder that checks the transmission error rate while decoding the wirelessly transmitted signal received from the first transmitting/receiving unit and outputs the checked transmission error rate, and a control unit that outputs to the transmitter said grade adjustment request signal requesting said down-adjustment when the transmission error rate output from the MPEG decoder is greater than a reference value and a grade lower than the current resolution grade of the current received signal exists.

The transmitter includes a tuner that receives an external signal from a reception device, and determines whether the external signal is analog or digital, a channel decoder that decodes said received signal when said received signal is digital, and generates a channel decoder output to a control unit in response to a first control input received from said control unit, an analog decoder that decodes said received signal when said received signal is analog, and generates a first analog decoder output, and generates a second analog decoder output to a multi-sound processor that generates an audio output, a selector that receives said first analog decoder output and said audio output and generates a video signal and an audio signal based on a second control input received from said control unit, said selector being configured to receive an external data input, an analog-to-digital converter that converts said video signal and said audio signal from analog to digital format, and sends said converted video signal and said converted audio signal to an encoder that outputs an encoded signal to said control unit, and the second transmitting/receiving unit outputting one of said channel decoder output and said encoded signal to said receiver as the wirelessly transmitted signal, and receiving said grade adjustment request signal.

The control unit outputs to the transmitter said grade adjustment request signal requesting said up-adjustment when the transmission error rate output from the MPEG decoder is less than a reference value and a grade higher than the current resolution grade of the current received signal exists.

The receiver further includes a display unit that receives a video output of the MPEG decoder for a user to view, and an audio decoder that receives an audio output of the MPEG decoder, and generates a decoded audio output to a speaker for said user to hear.

A method of controlling a wirelessly transmitted signal processed by a receiver and received from a transmitter is also provided. The method includes the steps of checking a transmission error rate of a packet of the wirelessly transmitted signal received from the transmitter, and transmitting a down-adjustment request signal to the transmitter with respect to a grade of the wirelessly transmitted signal when the transmission error rate is greater than a reference value, and when the wirelessly transmitted signal can be adjusted down to a grade lower than the resolution grade of the received signal.

The method further includes the steps of determining whether said transmission error rate is within a range of values, and performing said transmitting and receiving when said transmission error rate is not within said range.

The method further includes the step of receiving the down-adjustment request signal, converting the wirelessly transmitted signal to be transmitted into a format that corresponds to a revised signal having a grade lower than the resolution grade of the signal, and transmitting the converted signal to the receiver.

The method further includes the steps of transmitting an up-adjustment request signal to the transmitter with respect to a grade of the wirelessly transmitted signal when the transmission error rate is less than a reference value, and when the wirelessly transmitted signal can be adjusted up to a grade greater than the resolution grade of the signal, and receiving the up-adjustment request signal, converting the wirelessly transmitted signal to be transmitted into a format that corresponds to a revised signal having a grade higher than the resolution grade of the wirelessly transmitted signal, and transmitting the converted signal to the receiver.

In a method of controlling a digital video system including a transmitter that wirelessly outputs a wirelessly transmitted signal to be transmitted, and a receiver that wirelessly communicates with the transmitter, and processes the signal received from the transmitter, the method includes the steps of the receiver, checking a transmission error rate of a packet of the wirelessly transmitted signal received from the transmitter, transmitting a down-adjustment request signal to the transmitter with respect to a grade of the wirelessly transmitted signal when the transmission error rate is greater than a reference value, and when the wirelessly transmitted signal can be adjusted down to a grade lower than the resolution grade of the video signal, and the transmitter, receiving the down-adjustment request signal, converting the wirelessly transmitted signal to be transmitted into a format that corresponds to a revised signal having a grade lower than the resolution grade of the wirelessly transmitted signal, and transmitting the converted signal to the receiver.

The method further includes the steps of transmitting an up-adjustment request signal to the transmitter with respect to a grade of the wirelessly transmitted signal when the transmission error rate is less than a reference value, and when the wirelessly transmitted signal can be adjusted up to a grade greater than the resolution grade of the wirelessly transmitted signal, and the transmitter, receiving the up-adjustment request signal, converting the wirelessly transmitted signal to be transmitted into a format that corresponds to a revised signal having a grade higher than the resolution grade of the signal, and transmitting the converted signal to the receiver.

The method further includes the steps of determining whether said transmission error rate is within a range of values, and performing said transmitting and receiving when said transmission error rate is not within said range.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The preferred embodiments of the invention will be hereinafter described in detail with reference to the accompanying drawings.

Figure 1:
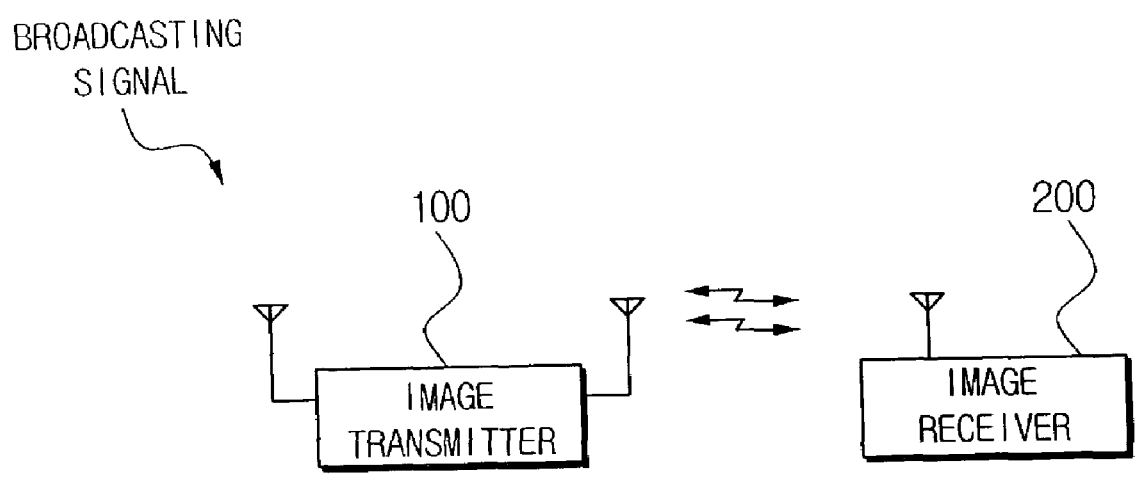
FIG. 1 is a block diagram showing a digital video system according to an exemplary, non-limiting embodiment of the present invention.

FIG. 1 is a block diagram showing a digital video system according to the invention. The digital video system comprises an image transmitter 100 and an image receiver 200. The image transmitter 100 corresponds to a set-top box, which receives a video signal transmitted wirelessly from a broadcasting station or satellite through the air, and then wirelessly transmits the received signal to the image receiver 200.

Upon receiving a video signal grade adjustment request signal in relation to a transmission rate and resolution from the image receiver 200 through a first transmitting/receiving unit 210 (see FIG. 3), the image transmitter-100 changes the format of a video signal to be transmitted. For example, but not by way of limitation, a video signal received wirelessly from the broadcasting station or satellite or through the cable from external devices is transmit wirelessly to the image receiver through a second transmitting/receiving unit 180 (see FIG. 2).

Figure 2:
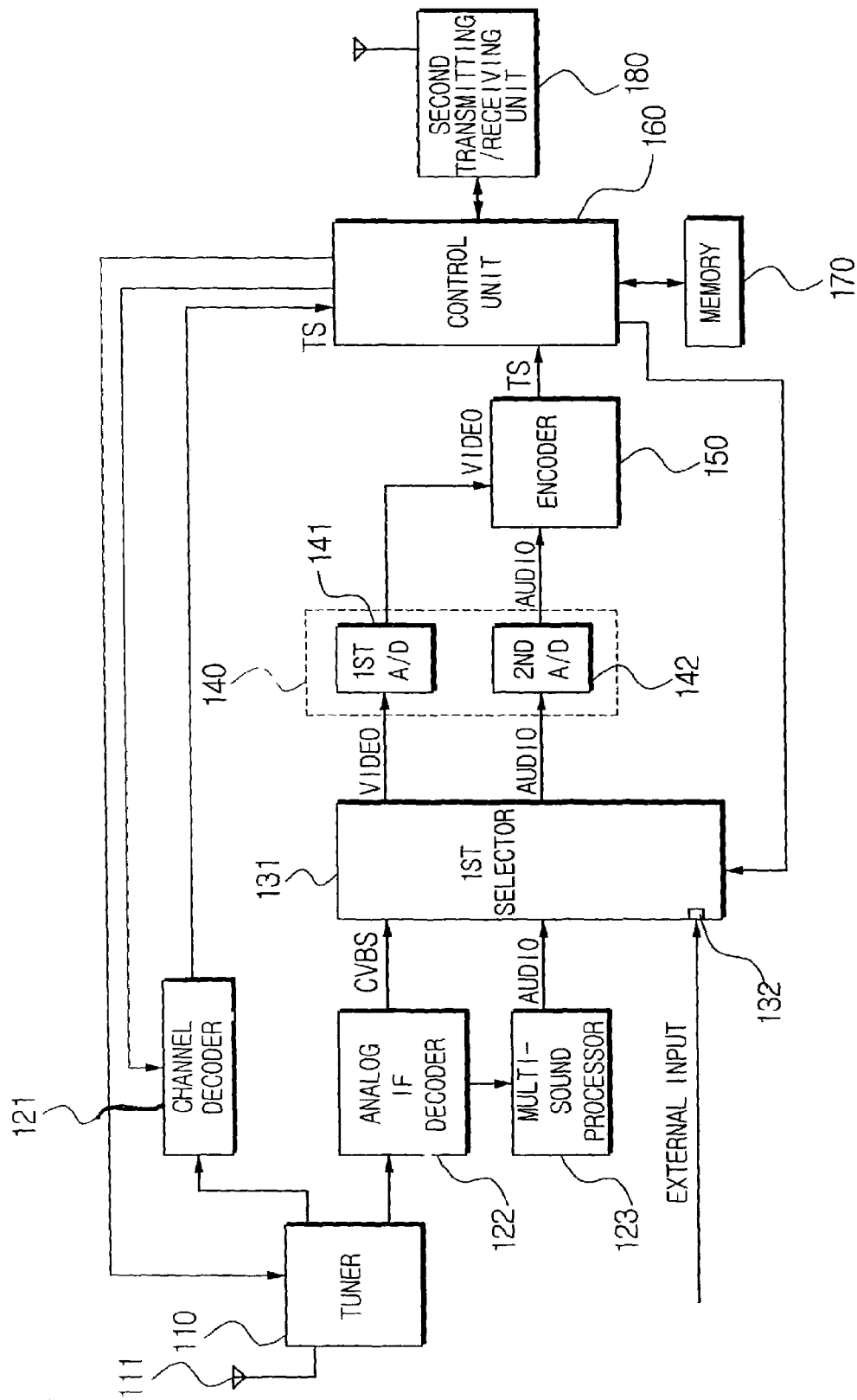
FIG. 2 is a block diagram showing an image transmitter of FIG. 1 according to an exemplary, non-limiting embodiment of the present invention.

FIG. 2 is a detailed block diagram showing the image transmitter 100. The image transmitter includes a tuner 110, a control unit 160 and a second transmitting/receiving unit 180. The tuner 110, which is adapted for analog and digital broadcasting, outputs a received signal through an antenna 111 to a corresponding output channel.

Also, a channel decoder 121 receives a digital broadcast signal and outputs a video signal corresponding to the selected output channel of the signal outputted from the tuner 110 to the control unit 160. The signal outputted from the channel decoder 121 is a HD or SD-TS (Transport Stream) video signal.

An analog IF (Intermediate Frequency) decoder 122 decodes the analog broadcasting signal outputted from the tuner 110 to divide an audio signal from a video signal, thereby outputting the signals to a first selector 131. The audio signal outputted from the analog IF decoder 122 is output to the first selector 131 through a multi-sound processor 123.

The first selector 131 is provided with at least one terminal 132 for connecting to an external device such as a video reproducer for reproducing a video signal recorded at a recording medium such as a DVD, as well as a port for inputting an analog broadcasting signal received through the air.

The first selector 131 processes the signal of the input port selected by the control unit 160 so that the signal is outputted to a corresponding analog-to-digital converter 140.

The analog-to-digital converter 140 (A/D converter) converts the inputted analog signal into digital signal and outputs the digital signal. In FIG. 2, there is depicted, by way of an example, a first A/D converter 141 and a second A/D converter 142, respectively, for processing an audio signal and a video signal. An encoder 150 then encodes the signal from the A/D converter 140 in accordance with MPEG-2 video compression method.

The control unit 160 transmits the video signal inputted either through the encoder 150 or the channel decoder 121 to the image receiver 200 through the second transmitting/receiving unit 180. The control unit 160 may convert the video signal according to the grade as requested by the image receiver 200 before transmitting the same to the image receiver 200.

Figure 3:
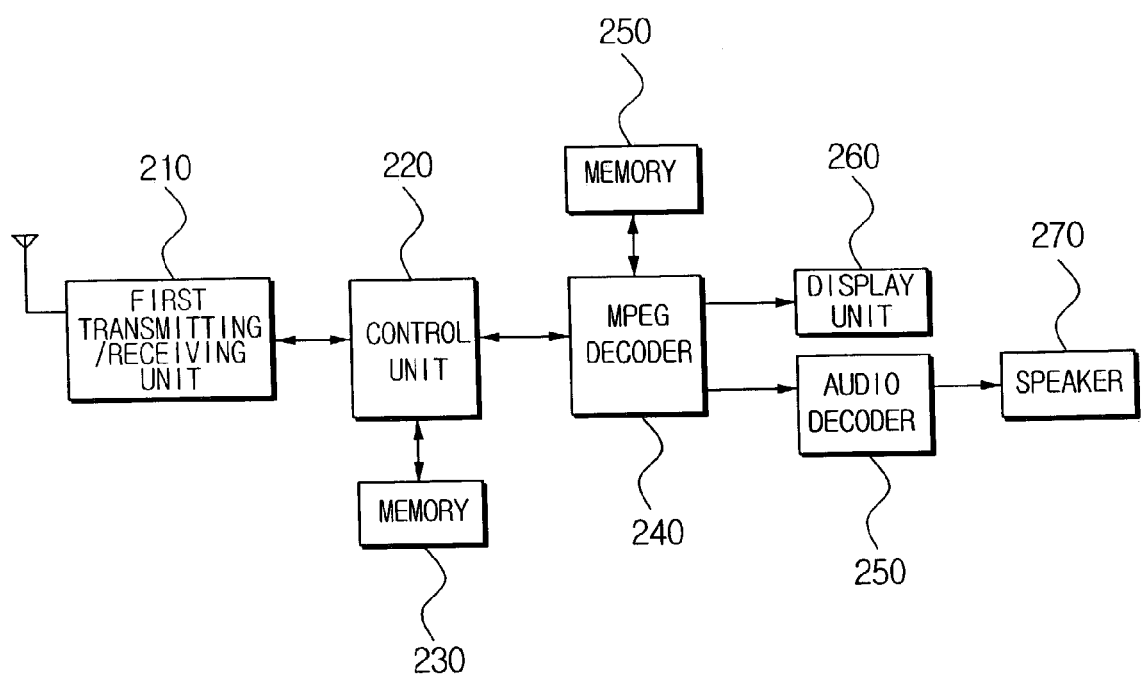
FIG. 3 is a block diagram showing an image receiver of FIG. 1 according to an exemplary, non-limiting embodiment of the present invention.

There is also provided a display unit 260 that displays the signal outputted from the MPEG decoder 240 on a screen (see FIG. 3).

The reference numeral 170 denotes a memory 170 used for the function execution of the control unit 160, and for conversion of the video signal.

With the reception of grade down-adjustment request from the image receiver 200 while the HD video signal is being transmitted from the image transmitter 100 to the image receiver 200, the control unit 160 converts the HD video signal into SD video signal, and transmits the same to the image receiver 200. With the reception of grade up-adjustment request from the image receiver 200 during the transmission of the SD video signal to the image receiver 200, the control unit 160 converts the SD video signal into HD video signal, and transmits the HD video signal to the image receiver 200.

Preferably, the control unit 160 applies three-grade system having HD grade (1080i, 720P), first SD grade (480P), and second. SD grade (480i), and adjusts the video signal pursuant to the grade adjustment request and according to these three grades. Here, 'P' refers to the progressive mode, and 'i' refers to an interlaced scanning mode.

When it is required to transmit HD video signal, the control unit 160 transmits the HD video signal to the image receiver 200 as it is. When it is required to transmit SD video signal, the control unit 160 converts the video signal into SD grade via the down-convergence, and transmits the same to the image receiver 200.

Various methods are available for the down-conversion of the HD video signal into the SD video signal. For example, Korean Patent Application No. 2002-0002617 discloses a conversion device and Korean Patent No. 0147209 discloses a video format converting apparatus for a HTV. Detailed descriptions about construction of the control unit and down-conversion method are referred to the KPA 2002-0002617 and Korean Patent No. 0147209, and thus omitted in this description. Meanwhile, converting SD signal, which is transmitted to the image receiver 100, into HD signal is carried out in the general ways such as interpolation.

FIG. 3 illustrates the image receiver 200 that corresponds to the image transmitter 100. The image receiver 200 includes a first transmitting/receiving unit 210, a control unit 220, a MPEG decoder 240, a display unit 260 and a speaker 270.

The first transmitting/receiving unit 210 wirelessly communicates signals with the image transmitter 100 to receive the signals therefrom. The MPEG decoder 240 decodes the video signal received from the first transmitting/receiving unit 210, and outputs such decoded signals to the display unit 260 if the decoded signals are video signals, or to an audio decoder 250 if the decoded signals are audio signals. The audio decoder 250 decodes the multi-sound signal such as Dolby AC3 for example, and outputs the decoded result to the speaker 270.

The MPEG decoder 240 also analyzes error check bit in the packet of the video signal, calculates transmission error rate, and transmits the calculated information about the transmission error rate to the control unit 220.

The control unit 220 compares the transmission error rate transmitted from the MPEG decoder 240 with a predetermined reference value, and accordingly determines whether the grade adjustment for the video signals to be received is possible. If it is determined to be necessary, the control unit 220 transmits a grade adjustment signal to the image transmitter 100 via the first transmitting/receiving unit 210. Reference numerals 230 and 250 denote respective memory devices.

Figure 4:
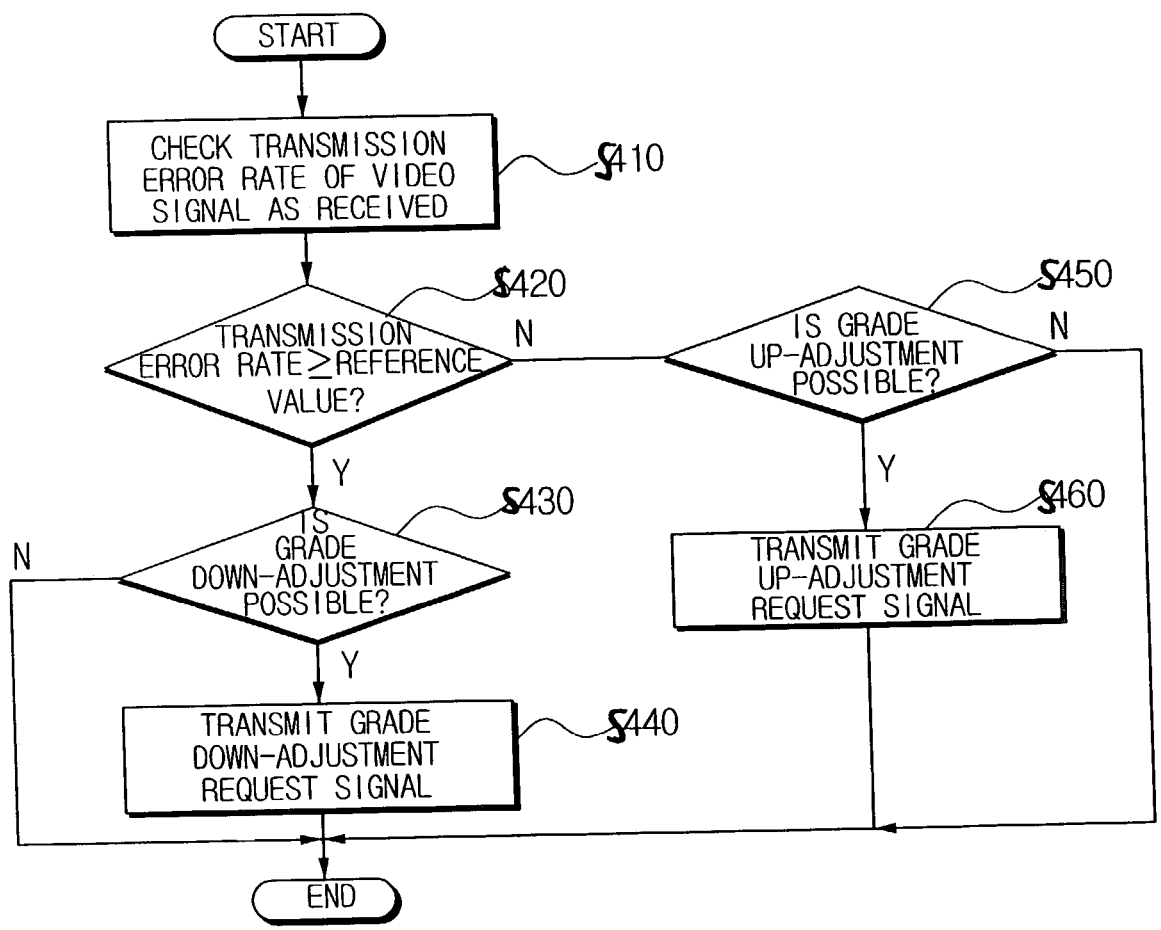
FIG. 4 is a flow chart illustrating an image control process according to an exemplary, non-limiting embodiment of the present invention.

FIG. 4 illustrates operation of the image receiver 200 of the digital video system constructed as above. First, the image receiver 200 checks the transmission error rate of the video signal as received (step S410). Next, it is determined whether the transmission error rate is greater than a predetermined reference value (step S420).

When the transmission error rate is determined to be greater than the predetermined reference value in S420, it is determined whether down-adjustment of grade is possible (step S430). When it is determined that the down-adjustment of grade is possible in S430, a grade down-adjustment request signal is wirelessly transmitted to the image transmitter 100. Accordingly, the image transmitter 100 down-adjusts the video signal to be transmitted by one grade, and then transmits the video signal to the image receiver 200 (step S440).

When the transmission error rate is determined to be lower than the predetermined reference value in S420, it is determined whether the up-adjustment of grade is possible (step S450). When it is determined that the current grade is the maximum, the received video signal is processed without requiring further adjustment of grades.

When it is determined that the current grade is other than the maximum grade in S450, a grade up-adjustment request signal is transmitted to the image transmitter 100. Accordingly, the image transmitter 100 receiving the grade up-adjustment request signal, converts the video signal to be transmitted to a higher grade, and then transmits the converted video signal to the image receiver 200 (step S460).

Other implementations of the presently claimed invention are possible. For example, but not by way of limitation, the control unit 220 of the image receiver 200 may have a grade adjustment method with which the control unit 220 requests a grade down-adjustment if the transmission error rate is higher than a first reference, maintains the current grade if the transmission error rate is in between the first reference and a second reference which is lower than the first reference, and requests a grade up-adjustment if the transmission error rate is lower than the second reference.

According to such a grade adjustment method, when it is determined at the image receiver 200 during a reception of the HD video signals that the transmission error rate has increased to the extent that normal display is no longer possible, the image receiver 200 sends out a grade down-adjustment request signal to the image transmitter 100. As the image receiver 200 accordingly receives the SD video signals, deterioration in display is prevented. Then when the transmission error rate is decreased due to change of wireless communication environment, the image receiver 200 requests the image transmitter 100 to up-adjust the video signal to the grade of high resolution. Accordingly, the image receiver 200 can display video signals while coping with the change of the wireless environment appropriately.

The aforementioned exemplary, non-limiting embodiments of the present invention may also be implemented in a computer readable medium. The computer readable medium may contain instructions corresponding to the aforementioned process, and implemented in the aforementioned apparatus.

As described above, the digital video system according to the present invention adjusts the grade of the video signals to be transmitted in accordance with the changes of the wireless communication environment, to have the transmission rate of the video signals within a predetermined range. As a result, the video signal receptivity increases.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for adjusting a grade of a wirelessly transmitted signal, comprising:
   a transmitter that receives an external telecommunication signal, and outputs an image signal; and
   a receiver that wirelessly receives said image signal and generates a display for a user,
   wherein the receiver comprises a control unit that outputs to the transmitter a feedback signal requesting down-adjustment of a grade of transmission of said image signal when a transmission error rate is greater than a first reference value and a grade lower than a current resolution grade of the image signal exists.

2. The system of claim 1, said receiver further comprising:
   an MPEG decoder that checks the transmission error rate while decoding the signal received from a transmitting/receiving unit of the transmitter and outputs the checked transmission error rate.

3. The system of claim 2, wherein the control unit outputs to the transmitter said feedback signal requesting up-adjustment when the transmission error rate output from the MPEG decoder is outside a reference range and a grade higher than a resolution grade of the image signal exists.

4. The system of claim 3, said receiver further comprising:
   a display unit that receives a video output of the MPEG decoder for a user to view; and
   an audio decoder that receives an audio output of the MPEG decoder, and generates a decoded audio output to a speaker for said user to hear.

5. The system of claim 2, said receiver further comprising:
   a display unit that receives a video output of the MPEG decoder for a user to view; and
   an audio decoder that receives an audio output of the MPEG decoder, and generates a decoded audio output to a speaker for said user to hear.

6. The system of claim 1, wherein the control unit outputs to the transmitter a different feedback signal requesting up-adjustment of the grade of transmission of the image signal if the transmission error rate is less than a second reference value and a grade higher than the current resolution grade of the current received signal exists.

7. The system of claim 6, wherein the first reference value and the second reference value are the same.

8. The system of claim 6, wherein the first reference value is greater than the second reference value.

9. A system for adjusting a grade of a wirelessly transmitted signal, comprising:
   a transmitter that receives an external telecommunication signal, and outputs an image signal; and
   a receiver that wirelessly receives said image signal and generates a display for a user, wherein a feedback signal is provided to said transmitter when a transmission error rate is not within a reference range, and said transmitter alters a grade of transmission of said image signal in response to said feedback signal,
   wherein the transmitter comprises:
   a tuner that receives the external telecommunication signal from a reception device, and determines whether the external telecommunication signal is analog or digital;
   a channel decoder that decodes said received signal when said received signal is digital, and generates a channel decoder output to a control unit in response to a first control input received from said control unit;
   an analog decoder that decodes said received signal when said received signal is analog, and generates a first analog decoder output, and generates a second analog decoder output to a multi-sound processor that generates an audio output;
   a selector that receives said first analog decoder output and said audio output and generates a video signal and an audio signal based on a second control input received from said control unit, said selector being configured to receive an external input;
   an analog-to-digital converter that converts said video signal and said audio signal from analog to digital format, and sends said converted video signal and said converted audio signal to an encoder that outputs an encoded signal to said control unit; and
   a transmitting/receiving unit outputting one of said channel decoder output and said encoded signal to said receiver, and receiving said feedback signal.

* * * * *